United States Patent [19]

Sato

[11] Patent Number: 5,154,403
[45] Date of Patent: Oct. 13, 1992

[54] POWER PLANT SUSPENSION DEVICE

[75] Inventor: Shigeki Sato, Yokosuka, Japan

[73] Assignee: Nissan Motor Co., Ltd., Yokohama, Japan

[21] Appl. No.: 631,017

[22] Filed: Dec. 20, 1990

[30] Foreign Application Priority Data

Dec. 25, 1989 [JP] Japan ................. 1-335678

[51] Int. Cl.⁵ ........................... F16F 1/38; F16F 9/50
[52] U.S. Cl. ........................ 267/141.2; 180/312;
180/300; 248/635; 248/638; 167/153; 167/293;
167/140.15
[58] Field of Search .............. 267/140.1 R, 140.1 C,
267/140.1 AE, 140.1 E, 141.2, 153, 292, 293;
180/300, 312, 292; 248/635, 638; 123/192 R,
195 A

[56] References Cited

U.S. PATENT DOCUMENTS 3,762,671 10/1973 Schulz ..................... 248/9

FOREIGN PATENT DOCUMENTS

| 3214037 | 10/1983 | Fed. Rep. of Germany . | |
| 3901737 | 7/1990 | Fed. Rep. of Germany . | |
| 3902605 | 8/1990 | Fed. Rep. of Germany . | |
| 220926 | 10/1986 | Japan ................... | 180/300 |
| 63-92851 | 4/1988 | Japan . | |
| 63-203941 | 8/1988 | Japan . | |
| 231032 | 9/1988 | Japan ................... | 267/140.1 C |
| 44326 | 2/1989 | Japan ................... | 180/312 |
| 114522 | 5/1989 | Japan ................... | 180/312 |
| 2222657A | 6/1989 | United Kingdom . | |
| 2234318A | 1/1990 | United Kingdom . | |

*Primary Examiner*—George A. Halvosa
*Attorney, Agent, or Firm*—Foley & Lardner

[57] ABSTRACT

A U-shaped bracket supports an elastomeric bush type vibration damping mount on a power unit (ICE plus transmission). The inner tubular member of the damper is mounted on the arms of the bracket by way of a bolt. First and second tubular piezoelectric/electrostrictive strain generating elements are symmetrically disposed about the bolt and housed within the inner tubular member of the mount. A control unit which is responsive to crank angle and engine speed, produces a AC current and applies the same to the first strain generating element. The phase of the same current is shifted by 90° before being applied to the second strain generating element. The voltage and frequency of the AC current are selected in accordance with a predetermined schedule which is based on engine speed and crank angle and which enables the AC currents to be applied in a manner which generate vibrations which tend to negate the vibrations which are transmitted from the power unit to the bolt by way of the arms of the U-shaped bracket.

9 Claims, 7 Drawing Sheets

| ENGINE SPEED | AC FREQ.(HZ) | AC VOLT. | TRIGGER TIMING (CRANK ANGLE) |
|---|---|---|---|
| 550-700 | — | 0 | — |
| 700-710 | 11.7 | 500 | 122 Deg. |
| 710-720 | 11.9 | 500 | 124 Deg. |
| 720-730 | 12.1 | 550 | 124 Deg. |
| 730-740 | 12.3 | 550 | 122 Deg. |
| ... | ... | ... | ... |
| ... | ... | ... | ... |
| 3000-3020 | 50.1 | 2000 | 36 Deg. |
| 3020-3040 | 50.5 | 2000 | 34 Deg. |
| 3040-3060 | 50.8 | 2000 | 34 Deg. |
| ... | ... | ... | ... |
| ... | ... | ... | ... |

POWER PLANT SUSPENSION DEVICE

BACKGROUND OF THE INVENTION

1. Field of the Invention

The present invention relates generally to an engine (power plant) suspension device and more specifically to a device which can be interposed between a vehicle chassis and a power plant and which can be electrically controlled in a manner whereby the attenuation of vibration which is applied to the vehicle chassis, is improved.

2. Description of the Prior Art

Figure 8:
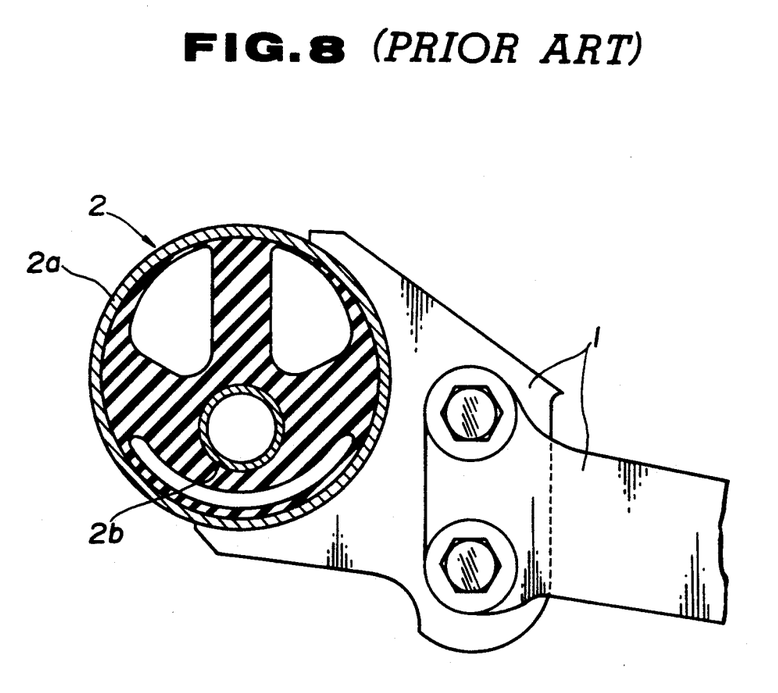
FIG. 8 is an elevation view showing the prior art arrangement discussed in the opening paragraphs of the instant disclosure.

FIG. 8 shows a prior art arrangement wherein a cylindrical engine mount 2 is supported on a bracket and operatively connected with a power plant (e.g. a transaxle type arrangement wherein the engine and the transmission are combined into a single unit). As will be appreciated from this figure, the mount comprises a cylindrical outer housing 2a and a tubular member 2b which are interconnected by way of an apertured elastomeric body.

However, this arrangement has suffered from a drawback in that the vibration, which is applied to the mount from the power plant, tends to include the resonance frequency of the bracket 1, and thus induces the same to resonate. As a result, the degree of attenuation of vibration transmission between the power plant and the chassis to which the bracket 1 is connected, has not been as high as desired, and has lead to the generation of reverberation noise in the vehicle cabin, particularly during vehicle acceleration.

SUMMARY OF THE INVENTION

It is an object of the present invention to provide an arrangement which is responsive to the vibration applied to an engine mount and which enables a vibration attenuating displacement (vibration) to be controllably produced in a manner which attenuates the amount of vibration which is resultingly applied to a vehicle chassis.

In brief, the above object is achieved by an arrangement wherein a U-shaped bracket supports an elastomeric bush type vibration damping mount on a power unit (ICE plus transmission). The inner tubular member of the damper is mounted on the arms of the bracket by way of a bolt. First and second tubular piezoelectric-/electrostrictive strain generating elements are symmetrically disposed about the bolt and housed within the inner tubular member of the mount. A control unit which is responsive to crank angle and engine speed, produces an AC current and applies the same to the first strain generating element. The phase of the same current is shifted by 90° before being applied to the second strain generating element. The voltage and frequency of the AC current are selected in accordance with a predetermined schedule which is based on engine speed and crank angle and which enables the AC currents to be applied in a manner which generate vibrations which tend to negate the vibrations which are transmitted from the power unit to the bolt by way of the arms of the U-shaped bracket.

More specifically, a first aspect of the present invention comes in a mounting device which features: an inner member; an outer member; an elastomeric body operatively interconnected between said inner and outer members; a bracket for supporting said inner member on a vibrating body; and electrically controllable strain generating means disposed between said bracket and said inner member.

A second aspect of the invention comes in a mounting device which features: an inner cylindrical member; an outer cylindrical member; an elastomeric body operatively disposed between said inner and outer cylindrical members; a U shaped bracket for supporting said inner cylindrical member on a vibrating body, said inner cylindrical member; and electrically controllable strain generating means disposed between said bracket and said inner member, said strain generating means including an element formed of one of a piezoelectric element and a electrostrictive element.

A further aspect of the invention comes in a system which features: a vibrating body; a base; a U-shaped bracket fixedly connected to the vibrating body; a support bracket fixedly connected to said base; a tubular outer member rigidly connected to said support bracket; an tubular inner member connected to said U-shaped member by a bolt which passes through the inner member and legs of said U-shaped bracket; an elastomeric body operatively disposed between said inner and outer members; and electrically controllable strain generating means disposed between said bolt and said inner member.

A further important feature of the invention comes in that the above mentioned strain generating means comprises first and second strain generating elements which have tubular configurations and which are disposed about said bolt, said first and second strain generating elements having inboard ends which are separated by an inwardly extending projection formed on an inner wall of said first member, said first and second strain generating elements being arranged in an essentially symmetrical manner on either side of said inwardly extending projection and so that the outboard ends thereof are in engagement with the legs of said U-shaped bracket.

In combination with the above mentioned first and second strain generating elements the present invention further features a source of AC current, the source including control means responsive to parameters which vary with the vibration generated by said vibrating body and which applies an alternating current having a selectively adjustable voltage and frequency to the first strain generating element, phase shifts the same current by 90° and applies it to the second strain generating element.

DETAILED DESCRIPTION OF THE PREFERRED EMBODIMENTS

Figure 1:
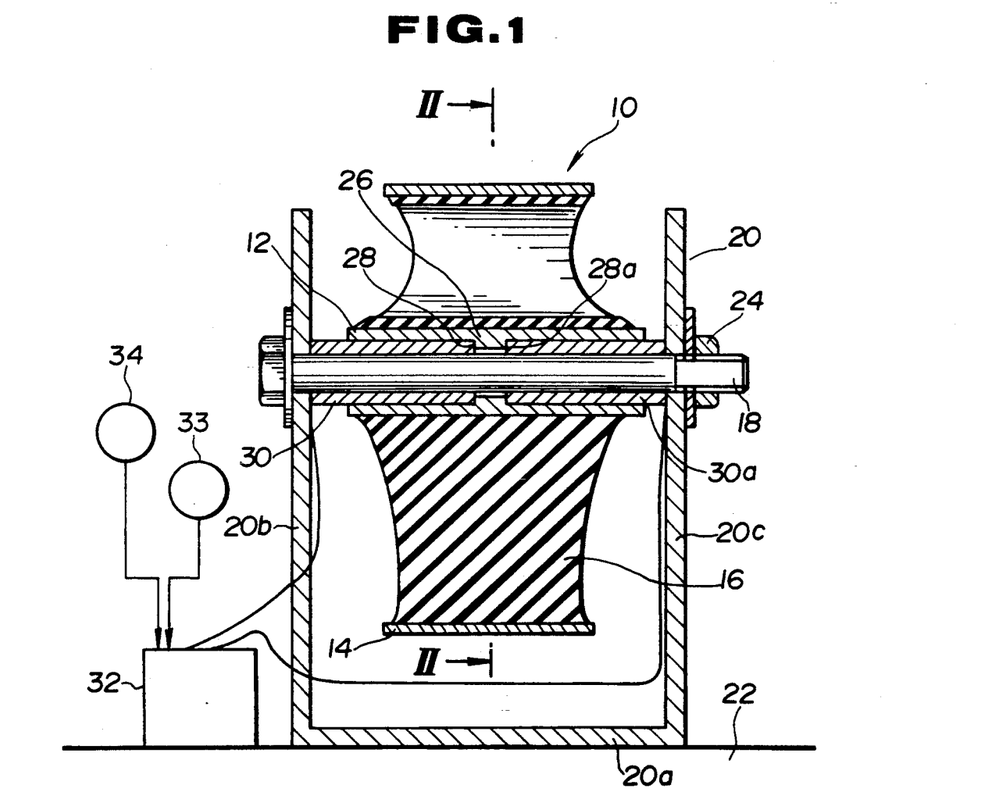
FIG. 1 is a cross-sectional view showing the construction which characterizes a first embodiment of the present invention.
Figure 2:
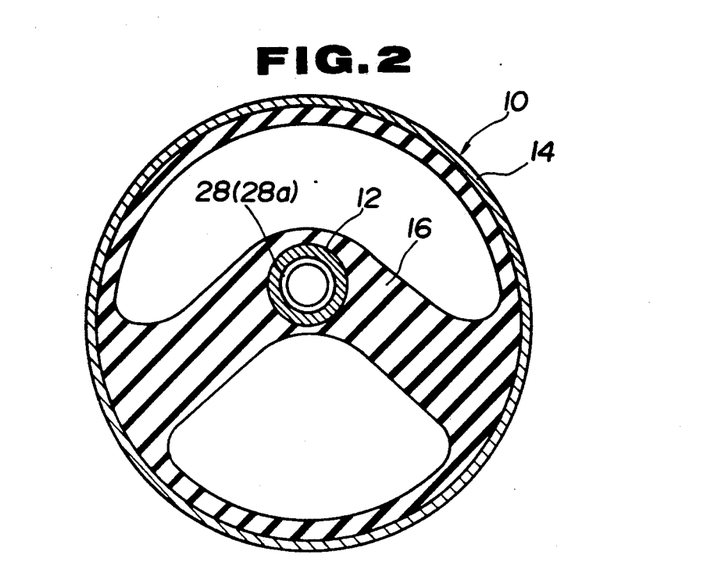
FIG. 2 is a sectional view as taken along section line II—II of FIG. 1.

FIGS. 1 and 2 show a first embodiment of the present invention. In this arrangement, a vibration attenuating mount 10 basically comprises: an inner tubular or cylindrical member 12, an outer tubular or cylindrical member 14 and an apertured elastomeric body 16 which is fixedly connected between the inner peripheral surface of the outer member 14 and the outer surface of the inner member 12.

The mount 10 is supported on a bracket 20 by way of a bolt 18 which is disposed through the inner member 12. In this case the bracket 20 is fixedly connected to a power plant 22 while the outer cylindrical member 14 is adapted to be received in a cylindrical support portion of a bracket which is connected to a vehicle chassis (see element 40 in FIG. 6 by way of example). In this embodiment the bracket 20 has an essentially "U" shape. The bottom or base portion 20a of this bracket is connected with the power unit or plant 22 by way of one or more bolts, not shown. The upwardly extending support legs 20b, 20c of the bracket are formed with diametrically opposed holes through which the bolt 18 is disposed and secured in place by a nut 24.

The inner member 12 is formed with a radially inward projecting portion 26 which extends toward but does not contact the bolt. First and second piezoelectric actuators 30, 30a in the form of sleeve-like piezoelectric-electrostrictive elements, are disposed about the bolt 18 and within the inner member 12 in a manner wherein the inboard ends of the elements abut the side edges 28, 28a of the inwardly extending projection 26, while the outboard ends thereof are in engagement with the legs 20b, 20c of the bracket 20. A given amount of clearance is defined between the elements 30, 30a and the members between which they are inserted.

In this instance the first and second actuators 30, 30a are electrically connected with a control unit 32 and are formed of the type of piezoelectric material which is responsive to external electrical fields and which exhibits large field resistance and non-linear strain/electric field hysteresis characteristics. Alternatively, the actuators can be made of an electrostrictive type of material which exhibits a very small field resistance which proximates quadratic curvature. Disclosure relating to this type of material can be found on page 51 of "Piezoelectric/electrostrictive Actuators" published by the Morikita Publishing company in December of 1986).

The above mentioned two types of material mainly differ in terms of phase transition temperature (Curie Point) and will be referred to collectively as piezoelectric-electrostrictive ceramics.

The control unit 32 is connected with a crank angle sensor 33 and engine speed sensor 34 and arranged to produce control characteristics which are suited to suppressing vibration which are excited by the most predominant type of vibration produced by the engine. In this instance this vibration is assumed to be the second harmonic (generated by four cylinder/four cycle engines) merely by way of example.

It will be noted that although two separate sensors have been shown connected to the control unit 32, the two can be combined into a single sensor. Viz., the crank angle sensor 33 alone is capable of also providing the engine speed by determining the change in crank angle per unit time or the time required for a predetermined amount of crank angle change.

In this case, as the object is to control the secondary harmonic and higher classes of vibration, the primary harmonic is determined from the engine rotational speed and halved. In this manner an AC current having frequency which proximates the axially acting secondary harmonic vibration is applied to the first of the two actuators. The signal is then phase shifted by 90° and applied to the second actuator.

Figure 9:
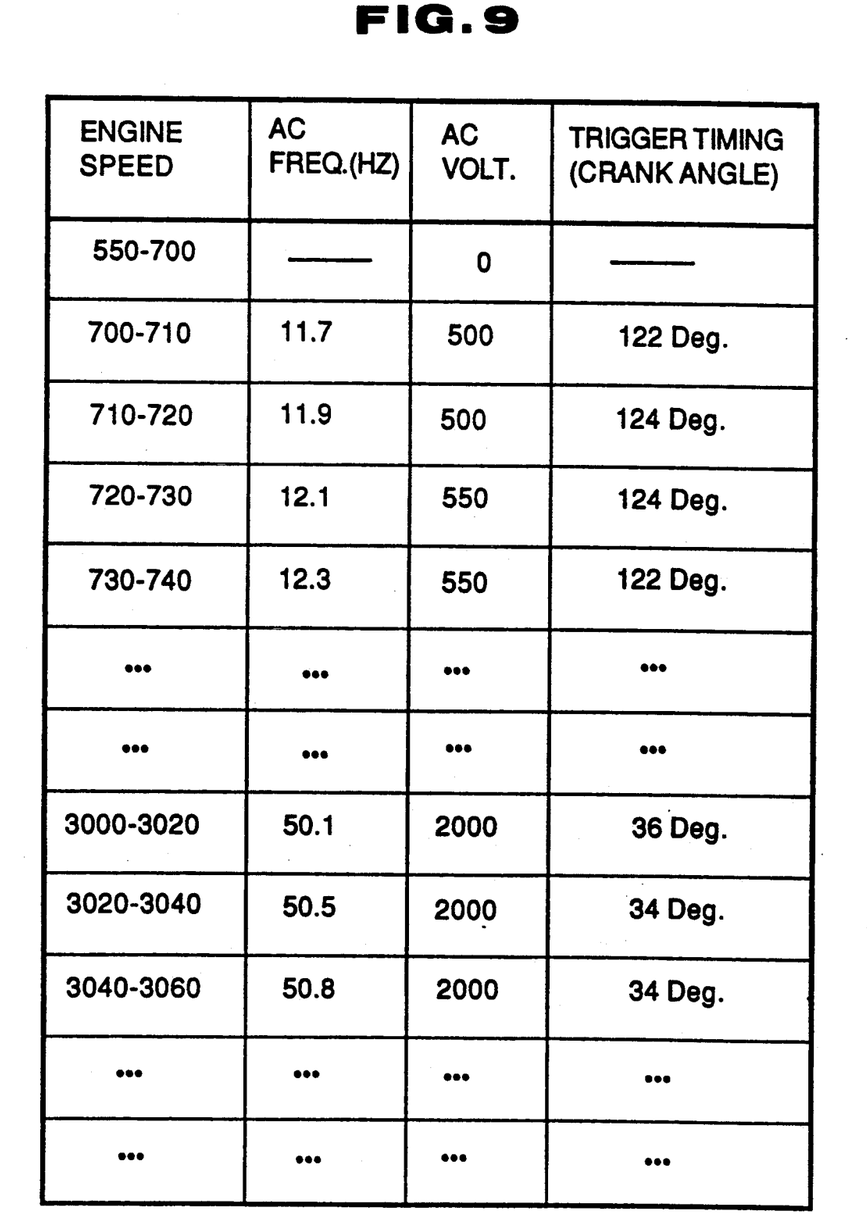
FIG. 9 shows in table form an example of a map which can be used according to the invention.

On the other hand, in the event that the output of a crank angle sensor is used, as the vibration of the mount 10 can be approximated from crank angle position and the frequency, the phase of the AC current to be applied to the actuators can be determined using a predetermined timing map (viz., a map which is recorded in terms of crank angle sensor output and engine speed (RPM). FIG. 9 shows in tabled form, an example of a map which can be used to determine the AC current frequency, voltage level and the crank angle time at which the voltage should be applied.

Figure 3:
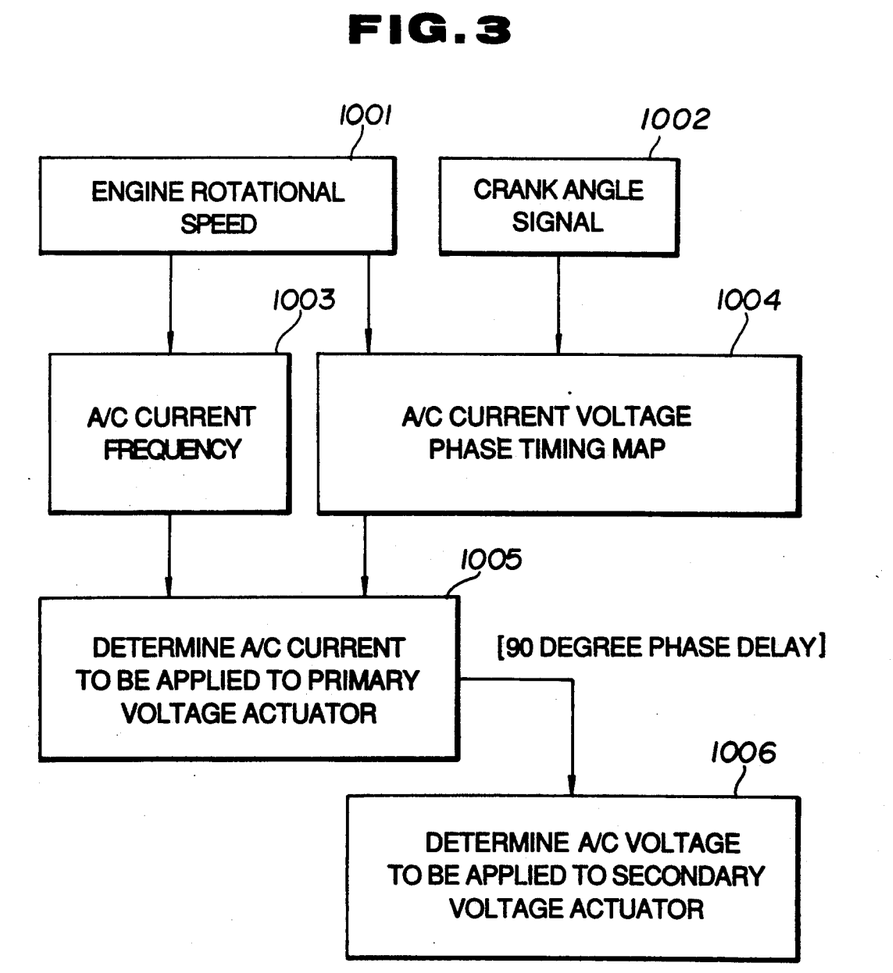
FIG. 3 is a functional block diagram showing the control concept which is used in the first embodiment of the present invention.

The instant embodiment is such as to make use of a suitable algorithm which, as schematically indicated in block diagram form in FIG. 3, detects the engine rotational speed and the crank angle output at stages 1001 and 1002. Determines the frequency of the AC current at stage 1003 using the engine speed and at stage 1004 uses a timing map of the nature shown in FIG. 9 in conjunction with both the engine speed and crank angle signals. Next, at stage 1005 the voltage and frequency of the AC current are determined and a signal exhibiting the same is applied to the first actuator 30. At stage 1006 the phase of the AC voltage is phase delayed by 90° and then applied to the second actuator 30a.

OPERATION

As mentioned above, in the case of a four cylinder engine the secondary vibration component or harmonic and higher orders create noise problems. When the vibration frequency matches the resonance frequencies of the power plant 22 and bracket 20, the mount per se vibrates and this vibration is transmitted to the vehicle chassis. Under these conditions vibration in the frequency range of (50–500 Hz) tend to be transmitted to the vehicle cabin in a manner which induces reverberation noise therein.

Particularly in the case of reverberation noise caused by vibration in the range of 50–200 Hz, it is possible to make use of the U-shape of the bracket 20 which forms part of the instant embodiment in that, due to the parallel nature of the legs 20b, 20c, vibration tends to be conducted from the power unit 22 the bolt 18 and to subsequently tends to concentrate at the mid-point of the same. The vibration of the bolt 18 is then transferred via the inner cylindrical member 12 of the mount 10 to the bracket on which the mount 10 is supported.

While this phenomenon presents a serious problem, if the vibration which is transferred axially along the bolt 18 can be attenuated in a controlled manner, then the vibration transmission ratio can be reduced.

According to the control depicted in FIG. 3, the voltages which are applied to the actuators 30 and 30a can be controlled in a manner whereby the resulting axial elongation and contraction of the two actuators 30, 30a can be used to produce vibrations which react against and offset that being applied from the legs 21b, 21c. This of course enables a great reduction in the amount of vibration which is transmitted to the vehicle chassis.

Figure 4:
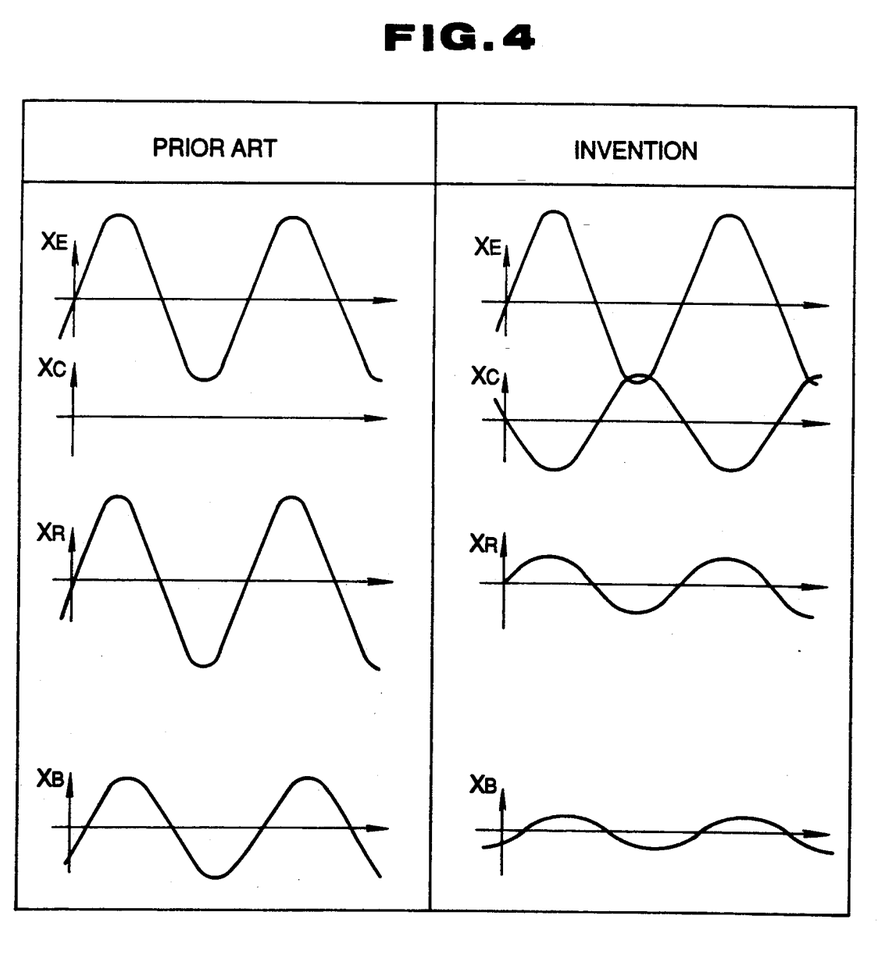
FIG. 4 is timing chart comparing the displacement (vibration) characteristics obtained with the prior art with those obtained with the present invention.

FIG. 4 graphically compares the vibration damping characteristics of the prior art with those of the present invention. In this figure:

XE denotes the displacement of the engine toward the inner cylindrical member 12 of the damper 10;

XC denotes the displacement induced by the actuators 30, 3a;

XR denotes the displacement which results after the actuator induced displacement is added to the bolt 18; and XB denotes the displacement of the bracket 20 per se.

As will be noted, as the prior art is not provided with a vibration cancelling displacement input corresponding to XC, the vibration XE of the engine is conducted to the bolt 18 with almost no damping. The vibration XB of the bracket 20 itself accordingly is substantial.

On the other hand, with the present invention due to the addition of the controlling displacement or vibration XC in the reverse phase, the displacements XC and XE tend to cancel one another resulting in a greatly reduced bracket vibration XB.

Figure 5:
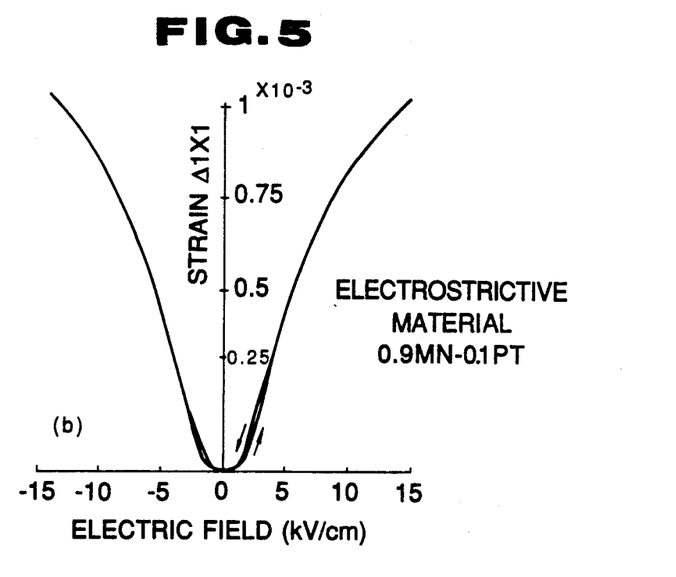
FIG. 5 is a graph showing the strain and electric field relationship which is produced by a piezoelectric-electrostrictive material suitable for use in the present invention.

FIG. 5 is a graph which shows an example of the non-linear relationship which develops between the electric field and the resulting strain when a given piezoelectric-electrostrictive material is used. It will be noted that as the amount of strain which is produced is determined by the applied electric field and is not effected by the orientation of the field, the amount of displacement produced by the actuators can be readily determined by controlling the voltages which are applied. Further, as the response of the actuators 30, 30a varies between a few msec to a few $\mu$sec, the response time can be considered to have a negligible effect on the generation of the target frequency.

It will be noted that as two mutually opposed actuators 30, 30a are used on either side of the inwardly extending projection 26, by applying voltages which are 90° out of phase with one another to the same, the desired displacement control of the engine mount is more readily achieved than in the case where only one piezoelectric-electrostrictive element were to be used.

Further, it will be noted that in the above disclosed embodiment, the actuators are cylindrical and symmetrically arranged between the bolt and the inner cylindrical member 12. This reduces the amount of space required for the same and facilitates engine room layout as compared with arrangements wherein an elongated member is oriented against the vibration to be controlled.

As load does not effect the driving direction of the piezoelectric-electrostrictive elements, past durability problems are overcome and life of the actuators is greatly extended.

Figure 6:
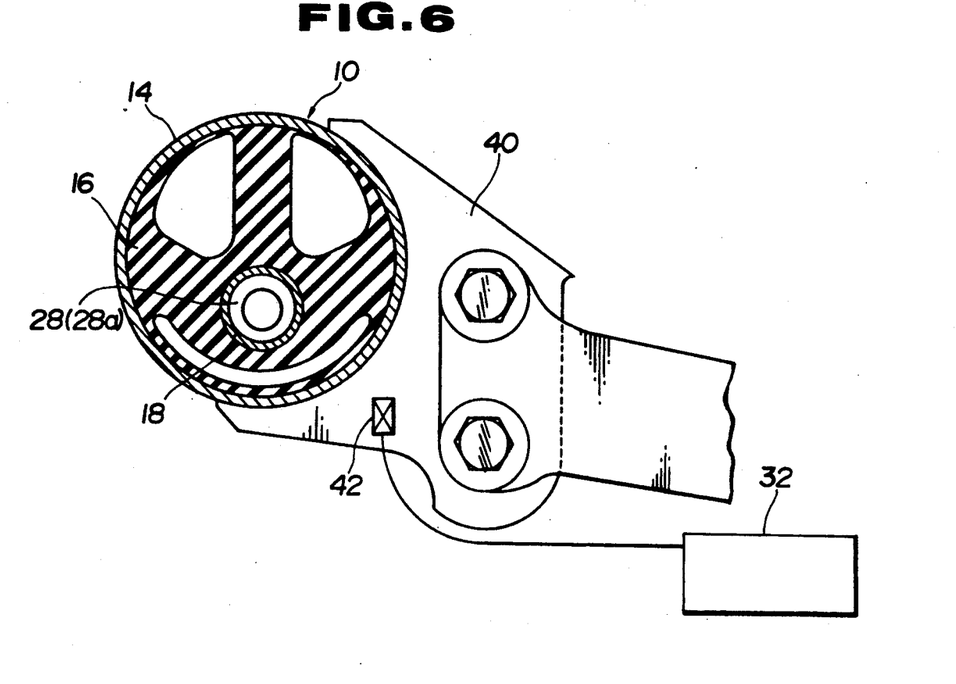
FIG. 6 is an elevational view partially in section, which shows the construction which characterizes a second embodiment of the present invention.

FIG. 6 shows a second embodiment of the present invention. This arrangement is basically similar to the first embodiment and differs in that, in order to particularly control the resonance of the bracket 40, which is connected to the vehicle chassis and which supports the outer cylindrical member 14 of the engine mount 10, a strain gage 42 is disposed on the bracket. This gauge directly detects the amount of strain which is developed in the bracket 40. Using suitable algorithms, the frequency and magnitude can be used to modify, update and/or supplement the data depicted in the table of FIG. 9 in a manner which enables the amount of vibration which is detected in the bracket to be reduced toward a zero level. The manner in which this type of feedback control can be implemented is deemed to be fully within the grasp of the those skilled in the art of vibration control/computer programming.

Figure 7:
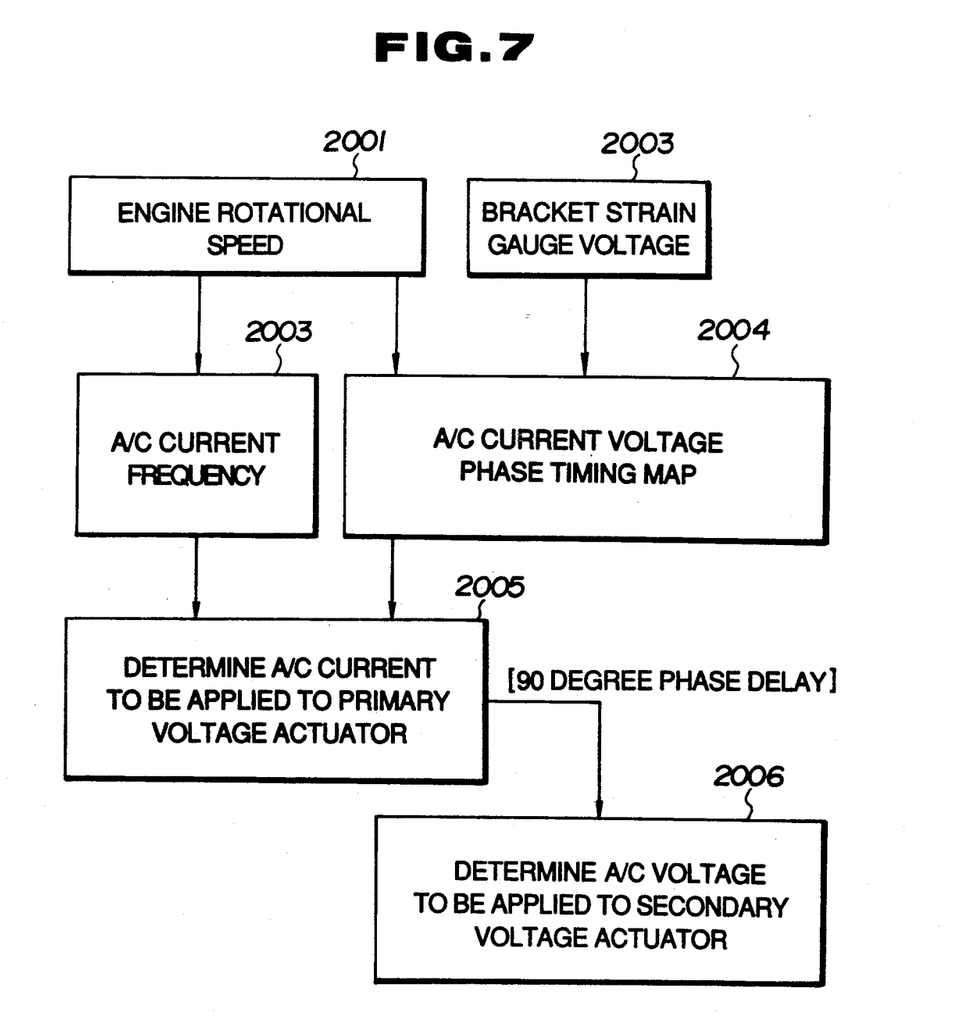
FIG. 7 is a functional block diagram showing the control concept which is used in the second embodiment of the present invention.

FIG. 7 shows in block diagram form the conceptual arrangement of the second embodiment. It is deemed that the FIG. 7 is self-explanatory and that the concept and arrangement of the second embodiment will be fully comprehended in light of the above disclosure.

The present invention of course is not limited to controlling cabin reverberation noise and can find various application where vibration attenuation/control is required. However, one example where the invention is deemed to find particular application is in the attenuation of high frequency vibrations which tend to occur during vehicle acceleration.

What is claimed is:

1. A mounting device comprising:
   an inner cylindrical member;
   an outer cylindrical member;
   an elastomeric body operatively disposed between said inner and outer cylindrical members;
   a U-shaped bracket for connecting said mounting device to a vibrating body, said U-shaped bracket being connected to said inner cylindrical member; and
   electrically controllable strain generating means disposed between said U-shaped bracket and said inner cylindrical member and within said inner cylindrical member, said strain generating means including an element formed of one of a piezoelectric element and an electrostrictive element.

2. A system comprising:
   a vibrating body;
   a base;
   a U-shaped bracket fixedly connected to the vibrating body;
   a support bracket fixedly connected to said base;
   a tubular outer member rigidly connected to said support bracket;
   a tubular inner member connected to said U-shaped bracket by a bolt which passes through the tubular inner member and legs of said U-shaped bracket;
   an elastomeric body operatively disposed between said inner and outer tubular members; and
   electrically controllable strain generating means disposed between said bolt and said tubular inner member.

3. A system as claimed in claim 2 further comprising:
   a sensor which detects a parameter related with the vibration produced by the vibrating body; and
   a control unit operatively connected with said sensor and said strain generating means, said control unit being arranged to be responsive to the output of said sensor and including means for determining the frequency and the voltage level of an alternating current which is applied to said strain generating means.

4. A system as claimed in claim 2 wherein said strain generating means comprises first and second strain generating elements.

5. In a system:
- a vibrating body;
- a base;
- a U-shaped bracket fixedly connected to the vibrating body;
- a support bracket fixedly connected to said base;
- a tubular outer member rigidly connected to said support bracket;
- a tubular inner member connected to said U-shaped member by a bolt which passes through the tubular inner member and legs of said U-shaped bracket;
- an elastomeric body operatively disposed between said inner and outer tubular members; and
- electrically controllable strain generating means disposed between said bolt and said tubular inner member;
- wherein said strain generating means comprises first and second tubular strain generating elements which are disposed about said bolt, said first and second strain generating elements having inboard ends which are separated by an inwardly extending projection formed on an inner wall of said tubular inner member, said first and second strain generating elements being arranged in an essentially symmetrical manner on either side of said inwardly extending projection so that the outboard ends thereof are in engagement with the legs of said U-shaped bracket.

6. A system as claimed in claim 5 wherein said first and second strain generating elements are connected with a source of AC current, said source including control means responsive to parameters which vary with the vibration generated by said vibrating body and which applies an alternating current having a selectively adjustable voltage and frequency to the first strain generating element, phase shifts the same current by 90° and applies it to the second strain generating element.

7. A system as claimed in claim 6 wherein:
- said vibrating body is an internal combustion engine;
- said base is a vehicle chassis; and
- the parameters to which the control means is responsive are engine speed and crank angle.

8. A system as claimed in claim 6 further comprising a vibration sensor, said vibration sensor being disposed on said support bracket, said vibration sensor being operatively connected with said source of AC current, the control means in said source of AC current being responsive to the output of the vibration sensor in a manner to modify the voltage and frequency of the AC current which is applied to the first and second strain generating elements.

9. A system as claimed in claim 8 wherein said vibration sensor comprises a strain gauge.

* * * * *